United States Patent
Yu

(10) Patent No.: US 9,723,625 B2
(45) Date of Patent: Aug. 1, 2017

(54) DOWNLINK TRANSMISSION IN A MU-MIMO SYSTEM

(71) Applicant: Orange, Paris (FR)

(72) Inventor: Yifan Yu, Beijing (CN)

(73) Assignee: ORANGE, Paris (FR)

(*) Notice: Subject to any disclaimer, the term of this patent is extended or adjusted under 35 U.S.C. 154(b) by 110 days.

(21) Appl. No.: 14/367,722

(22) PCT Filed: Dec. 14, 2012

(86) PCT No.: PCT/IB2012/002921
§ 371 (c)(1),
(2) Date: Jun. 20, 2014

(87) PCT Pub. No.: WO2013/093617
PCT Pub. Date: Jun. 27, 2013

(65) Prior Publication Data
US 2015/0003350 A1    Jan. 1, 2015

(30) Foreign Application Priority Data
Dec. 21, 2011  (WO) ............... PCT/CN2011/084401

(51) Int. Cl.
*H04W 72/12*    (2009.01)
*H04B 7/04*    (2017.01)
(Continued)

(52) U.S. Cl.
CPC ...... *H04W 72/1273* (2013.01); *H04B 7/0452* (2013.01); *H04L 5/0023* (2013.01);
(Continued)

(58) Field of Classification Search
None
See application file for complete search history.

(56) References Cited

U.S. PATENT DOCUMENTS 8,238,496 B1 * 8/2012 Narasimhan ........ H04L 25/0208
375/231
8,774,136 B2 * 7/2014 Gan ..................... H04B 7/0417
370/329
(Continued)

FOREIGN PATENT DOCUMENTS

CN    101321007 A    12/2008
CN    101807973 A    8/2010
(Continued)

OTHER PUBLICATIONS

Pantech, "Enhance MIMO operation for low power node RRH", Aug. 26, 2011, 3GPP TSG RAN1 #66, pp. 1-4.*
(Continued)

*Primary Examiner* — Steve Young
(74) *Attorney, Agent, or Firm* — David D. Brush; Westman, Champlin & Koehler, P.A.

(57) ABSTRACT

A method is provided for managing a downlink transmission in a Multi User-Multiple Input Multiple Output (MU-MIMO) system. The MU-MIMO system includes a base station and a set of remote radio units connected to the base station. The method includes: obtaining large scale fading data related to a large scale fading over uplink transmission associated with a user equipment (UE); generating a UE-specific channel vector by using the large scale fading data; and scheduling a downlink transmission by using the UE-specific channel vector.

9 Claims, 4 Drawing Sheets

(51) Int. Cl.
*H04B 7/0452* (2017.01)
*H04L 5/00* (2006.01)
*H04B 7/024* (2017.01)
*H04B 7/06* (2006.01)

(52) U.S. Cl.
CPC ............ *H04B 7/024* (2013.01); *H04B 7/0626* (2013.01); *H04B 7/0639* (2013.01); *H04B 7/0663* (2013.01)

(56) References Cited

U.S. PATENT DOCUMENTS

| | | | | |
|---|---|---|---|---|
| 8,923,261 | B2* | 12/2014 | Lee | .......................... H04L 1/007 370/328 |
| 2010/0316163 | A1* | 12/2010 | Forenza | ................. H04B 7/024 375/296 |
| 2011/0188599 | A1 | 8/2011 | Kang et al. | |

FOREIGN PATENT DOCUMENTS

| | | | |
|---|---|---|---|
| CN | 102237950 A | | 11/2011 |
| WO | 2011077260 A2 | | 6/2011 |
| WO | WO 2011/077260 | * | 6/2011 |

OTHER PUBLICATIONS

International Search Report and Written Opinion dated Aug. 28, 2012 for corresponding Chinese International Application No. PCT/CN2011/084401, filed Dec. 21, 2011.

Pantech,"Enhance MIMO operation for low power node RRH", 3GPP Draft; R1-112286, 3rd Generation Partnership Project (3GPP), Mobile Competence Centre: 650, Route Des Lucioules; F-06921 Sophia-Antipolis Cedex; France, vol. RAN WG1, no. Athens, Greece; Aug. 22, 2011, Aug. 16, 2011 (Aug. 16, 2011), XP050537431.

International Search Report and Written Opinion dated Jun. 17, 2013 for corresponding International Application No. PCT/IB2012/002921, filed Dec. 14, 2012.

* cited by examiner

DOWNLINK TRANSMISSION IN A MU-MIMO SYSTEM

CROSS-REFERENCE TO RELATED APPLICATIONS

This Application is a Section 371 National Stage Application of International Application No. PCT/IB2012/002921, filed Dec. 14, 2012, which is incorporated by reference in its entirety and published as WO 2013/093617 on Jun. 27, 2013, in English.

TECHNICAL FIELD

The present invention relates to devices and methods for managing a downlink transmission in a Multi User-Multiple Input Multiple Output (MU-MIMO) system.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

The Third Generation Partnership Project (3GPP) Long-Term Evolution (LTE) standardization efforts have chosen the Multiple Input Multiple Output (MIMO) antennas system for the downlink (DL) radio transmission due to its nature of spatial division multiplexing, which brings a significant spectral efficiency improvement.

There is a wide agreement that multi-user MIMO (MU-MIMO) allows for better exploitation of multi-user diversity. The MU-MIMO system has multiple users served at the same time on the same subcarrier by means of spatial separation. The main challenge in MU-MIMO is that not all receive antennas can cooperate and, therefore, the transmitter has to take care of the inter-user interference by several means that includes the design of the precoders for spatial user separation as well as the scheduling for exploitation of multi-user diversity. It has been found that the throughput gain of MU-MIMO system highly depends on exploiting the multi-user diversity available in the system.

The MIMO system can be built in distributed antenna system (DAS) where many remote antenna ports are distributed over a large area and connected to a central processor by fiber, coax cable, or microwave link. In 3GPP's discussion, DAS is referred as Coordinated Multi-Point transmission/reception (CoMP) system. To be more specific, DAS in 3GPP-LTE is a system comprising a base station (BS) equipped with an extremely powerful base band unit (BBU), and several remote radio units (RRUs) connected to BBU, for example over high-speed optical fibers. These systems are used to cover a large geographical area (e.g. hundreds of meters). The base band processing as well as radio resource and network management functionalities are included in the BBU, while RRU usually equipped with multiple antennas is responsible for the conversion between radio frequency (RF) and digital intermediate frequency (IF) signals. Multiple user equipments (UEs) can get paired to collaborate with each other for transmission.

Currently, several versions of linear precoding have been discussed for standardization in 3GPP-LTE system in frequency division duplex (FDD) mode. There are basically two kinds of precoding schemes taken into consideration: channel vector quantization (CVQ) and per user unitary and rate control (PU2RC).

In CVQ, feedback from UE indicates a codebook entry, where the codebook contains quantized versions of a channel vector estimated by the UE. At the BS, the zero-forcing precoders are calculated with the UEs' feedback.

PU2RC defines the codebook that contains not quantized versions of the channel vectors themselves but possible precoding vectors. Then, the feedback received by the BS actually indicates a preferred precoder from a set of predefined precoders. In other words, the calculation of precoders is not needed at the BS.

Since the scheduling schemes should operate in conjunction with the precoding schemes, two scheduling schemes corresponding to the precoding schemes mentioned above are presented to select the UEs for DL transmission. One is corresponding to PU2RC precoding scheme. It is to group UEs that report orthogonal precoding vectors and select the group providing the highest total throughput. Another more general and greedy strategy is appropriate for CVQ precoding schemes, consists of adding one UE at a time, as long as the additional UE increases the overall throughput. It has been released that CVQ scheme generally is preferable over PU2RC scheme. Hence, CVQ is the mainstream strategy of DL transmission in 3GPP-LTE FDD MU-MIMO system.

In CVQ discussed in 3GPP-LTE, each UE selects a quantization vector $\hat{h}_k$, from a codebook of unit-norm row vectors of size $N=2^B$ (B being an integer), which is expressed as:

$$C=\{c_1, \ldots, c_N\} \quad (1)$$

Quantization vector $\hat{h}_k$ is determined according to the minimum Euclidean distance criterion, such that:

$$\hat{h}_k = c_n, \arg\max_{i=1,\ldots,N} \left|h_k \hat{h}_i^H\right| = \arg\max_{i=1,\ldots,N} \sqrt{\frac{n \cdot M_c}{T_k}} \left|h_k \hat{h}_i^H\right| \quad (2)$$

The codebook C is previously known to all the UEs and the BS. It is usually defined as the Discrete Fourier Transformation (DFT) matrix where the quantization vectors are obtained by truncating the top rows of the DFT matrix of size N. Each UE estimates its actual channel and feeds back the index n to the BS with B bits. Normally, n is considered as the channel direction information (CDI) of k-th UE.

In addition to CDI, namely the codebook index n, the BS should have the UE report the estimated channel quality information (CQI) expressed as:

$$CQI_k = \frac{\frac{\tilde{P}}{M_t}\left|h_k \hat{h}_k^H\right|^2}{1 + \frac{\tilde{P}}{M_t}\left(\|h_k\|^2 - \left|h_k \hat{h}_k^H\right|^2\right)} \quad (3)$$

where $M_t$ is the number of transmit antenna, $\tilde{P} = P/N_0$ and $N_0$ is the noise power. It is observed that the channel information used for the user scheduling in MU-MIMO system includes two components: CDI and CQI.

At the BS, the assembled precoding matrix is given by:

$$G(S) = \hat{H}(S)^H (\hat{H}(S)\hat{H}(S)^H)^{-1} \text{diag}(p)^{1/2} \quad (4)$$

where $S=\{s_1, \ldots, s_{|S|}\}$ is the set of UEs selected for transmission. $\hat{H}(S)=[\hat{h}_{s_1}^T, \ldots, \hat{h}_{s_{|S|}}^T]^T$ represents the concatenated quantized channel vectors of the selected users and $p=(p_{s_1}, \ldots, p_{s_{|S|}})^T$ is the vector of power normalization coefficients that impose the power constraint on the transmitted signal. As the total power P is assumed to be allocated equally to each transmit antenna, we have:

$$p_k = \frac{P}{|S|} \frac{1}{\|f_k\|^2} \quad (5)$$

where $f_k$ denotes the k-th column of $F(S)=\hat{H}(S)^H(\hat{H}(S)\hat{H}(S)^H)^{-1}$.

Denote with R(S) the achievable sum-rate when the set of users S is selected for transmission and the amount of transmit antennas is $M_t$. Then, the scheduling method for user selection can be described as following:

TABLE 1

Initialise $S = \emptyset$ and $R(S) = 0$
While $|S| \leq M_t$
1) find $k^* = \underset{k \notin S}{\mathrm{argmax}} R(S \cup \{k\})$
2) if $R(S \cup \{k^*\}) > R(S)$ update $S = S \cup \{k^*\}$ In scheduling stage, R(S) can be computed as:

$$R(S) = \sum_{k \in S} \log_2(1 + \gamma_k) \quad (6)$$

where $\gamma_k$ is the SINR of user k and given by:

$$\gamma_k = \frac{p_k}{P/M_t} CQI_k \quad (7)$$

In addition to the above methods currently presented by 3GPP LTE-A, another proposal has been proposed in patent application WO 2011/077260 to improve the system throughput in the MU-MIMO built based on DAS. The proposed strategy is similar to the traditional LTE-A defined CVQ schemes except two points: (1) BS constructs the UE specific channel vector for scheduling, and (2) UE takes new method to compute its CQI.

To create the UE specific channel vector, the UE may send out reference signals called as sounding reference signal (SRS) to the BS for uplink measurement. Then BS may estimate whether its signal can reach UE via checking the SRS from UE. We define a channel invisibility vector as:

$$V_{k,j} = \begin{cases} 1 & S_{k,j} \geq \alpha \\ 0 & S_{k,j} < \alpha \end{cases} \quad (9)$$

where $S_{i,j}$ denotes the strength of SRS from UE i to RRU j, and $\alpha$ is the receiver sensitivity of the UEs. Although there is no channel reciprocity between uplink and downlink in FDD system, it is practical to use SRS over uplink to estimate the possibility that signal over downlink can reach the UE because the link budget estimation prior to the system deployment can ensure the downlink signal is visible to UE as long as the BS is able to detect the signal from UE.

After having channel feedback $\hat{h}_k$ and $V_k$, the BS can construct the channel vector oriented to UE k as:

$$\tilde{h}_k = \hat{h}_k \cdot \mathrm{diag}\left(V_k \cdot \sqrt{\frac{n \cdot M_e}{T_k}}\right) \quad (10)$$

where n is the number of RRUs, $M_e$ is the amount of antennas in each RRU, and $T_k$ refers to the number of the transmit antennas whose signal can be received by the UE. Generally, we have:

$$T_k = \mathrm{sum}(V_k) \quad (11)$$

$$T_k \leq M_t \quad (12)$$

where $\mathrm{sum}(\bullet)$ represents the sum of the elements of the vector, and $\sqrt{n \cdot M_e/T_k}$ ensures that the norm of $\tilde{h}_k$ is 1.

In the scheduling stage, the BS exploits the channel vector $\tilde{h}_k$ instead of the quantization vector $\hat{h}_k$ to calculate the precoding matrix and the user set for transmission.

On the other hand, at the side of UE, the CQI for feedback is calculated as:

$$CQI_k^{new} = \frac{\frac{P}{T_k}|h_k \hat{h}_k^H|^2}{1 + \frac{P}{n \cdot M_e}\left(\|h_k\|^2 - \frac{n \cdot M_e}{T_k}|h_k \hat{h}_k^H|^2\right)} \quad (13)$$

Although DAS in 3GPP-LTE is helpful to increase system capacity and coverage, the current precoding schemes and scheduling methods, especially the CVQ method, may select excessive users with significant inter-user interference when they are used in distributed antenna architecture architectures.

Since the RRUs are dispersedly located around UE and may have totally different propagation path to the UE, it is possible that UE detects the signal strength of these RRUs as 0, meaning that the received signal has strength below the sensitivity of the UE's receiver due to the deep attenuation.

Thus, the actual channel vector estimated by the UE should have several elements of 0, and then the assembled channel matrix H(s) experienced by the transmitted signal is:

$$H(S) = \{\tilde{H}_{K \times L} O_{K \times Q}\}, L+Q=M_t \quad (14)$$

where $\tilde{H}_{K \times L}$ is the channel gain elements larger than 0, $O_{K \times Q}$ is the elements whose values are 0, K is the number of selected users, and the number of RRUs is $L+Q=M_t$.

It has to be noted that L+Q should be no less than number K to ensure the null-interference transmission. However, the BS assumes wrongly that the signal from all the transmit antennas can be received by the UEs because the quantization vectors reported by the UEs have not the elements of 0. Then it is possible that the BS may select more than L+Q users and generate the wrong precoding matrix, which inevitably leads to significant inter-user interference.

On the other hand, from the perspective of channel quantization, there is always significant quantization error in UEs' feedback since the signal from some of the RRUs cannot be detected by UEs. Thus, the quantization error between the actual channel vectors and the feedback vectors may always exist as well. Since the quantization error degrades the system throughput greatly, it is obvious that the traditional CVQ method is not sufficient to achieve the high throughput in an architecture with distributed antennas.

The method presented in WO 2011/077260 achieves performance improvement by relying on the DL signal separation due to the space barrier. In other words, the radio signal from the BS's antennas can be attenuated by the spatial elements such as distance and physical barrier.

However, when there is no strong spatial signal separation over downlink, the BS cannot achieve performance improvement as compared with the method presented in 3GPP LTE-A.

The invention will improve the situation.

SUMMARY

To address these needs, a first aspect of the present invention relates to a method for managing a downlink transmission in a Multi User-Multiple Input Multiple Output MU-MIMO system, the MU-MIMO system comprising a base station, and a set of remote radio units connected to the base station, the method comprising steps of:

/1/ obtaining large scale fading data related to a large scale fading over uplink transmission associated with a user equipment, /2/ generating a UE-specific channel vector by using the large scale fading data, and /3/ scheduling a downlink transmission by using the UE-specific channel vector.

This method aims at improving the system throughput, independently of the penetration loss value.

The large scale fading data may be obtained by performing a large scale fading estimation at the base station. In this case, the estimation may be performed by using a Sounding Reference Signal SRS received from a user equipment.

For example, step /1/ may comprise, at the base station, sorting remote radio units antennas sensed by the user equipment into two sets Di and Ui which are expressed as:

$$D_i = \{j : l_{ij} > l_{ik}, \forall k \in U_i\}$$

$$U_i = \{j : l_{ik} > l_{ij}, \forall k \in D_i\}$$

where $l_{ij}$ refers to an estimation of large scale channel gain from user equipment i to antenna j.

Alternatively, the large scale fading data may be obtained by performing a large scale fading estimation at a user equipment, the large scale fading data being received at the base station from the user equipment. In this case, the estimation may be performed by using a Channel State Indication CSI-RS received at the user equipment from the base station.

For example, step /1/ comprises, at the user equipment, sorting remote radio units antennas sensed by the user equipment into two sets Di and Ui which are expressed as:

$$D_i = \{j : l_{ij} > l_{ik}, \forall k \in U_i\}$$

$$U_i = \{j : l_{ik} > l_{ij}, \forall k \in D_i\}$$

where $l_{ij}$ refers to an estimation of large scale channel gain from user equipment i to antenna j.

Step /2/ may comprise, at the base station, calculating a UE-specific channel vector as:

$$\tilde{h}_i = \hat{h}_i \cdot \text{diag}\left(V_i \cdot \sqrt{\frac{M_t}{M_i}}\right)$$

where $\hat{h}_i$ is a code vector indexed by a user equipment feedback in a Discrete Fourier Transformation codebook, $M_t$ is a total number of remote radio units antennas, $M_i$ is a size of set Ui, and Vi is a vector defined as $V_i = (v_{i,1}, v_{i,2}, \ldots, v_{i,M_t})$, where:

$$v_{i,j} = \begin{cases} 1 & j \in U_i \\ 0 & j \in D_i \end{cases}$$

A second aspect of the present invention relates to a computer program product comprising a computer readable medium, having thereon a computer program comprising program instructions, the computer program being loadable into a data-processing unit and adapted to cause the data-processing unit to carry out the steps of the method according to the first aspect when the computer program is run by the data-processing unit.

A third aspect of the present invention relates to a base station of a Multi User-Multiple Input Multiple Output MU-MIMO system, the MU-MIMO system further comprising a set of remote radio units connected to the base station, the base station being configured to:

/1/ obtain large scale fading data related to a large scale fading over uplink transmission associated with a user equipment, /2/ generate a UE-specific channel vector by using the large scale fading data, and /3/ schedule a downlink transmission by using the UE-specific channel vector.

A fourth aspect of the present invention relates to a Multi User-Multiple Input Multiple Output MU-MIMO system, comprising a base station according to the third aspect, and a set of remote radio units connected to the base station.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF EMBODIMENTS

Embodiments of the invention deal with the problem of improving the downlink transmission in a Multi User-Multiple Input Multiple Output (MU-MIMO) system based on distributed antenna architecture.

Figure 1:
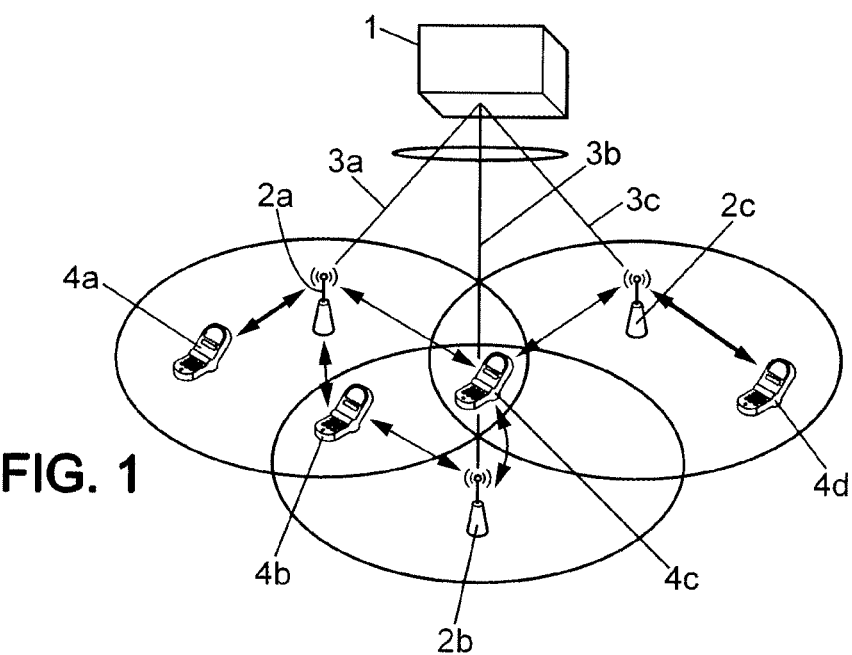
FIG. 1 is a schematic diagram of a MU-MIMO system based on distributed antenna architecture, according to some embodiments of the invention.

FIG. 1 represents a MU-MIMO system based on distributed antenna architecture. The MU-MIMO system comprises a base station (BS) 1, which is equipped with a powerful base band unit (BBU), and several remote radio units (RRUs) 2a-2c, which are respectively connected to the BS 1, for example over high-speed optical fibers 3a-3c.

The BS 1 is configured to perform base band processing, and to manage radio resource and network. Each RRU 2a-2c is equipped with multiple antennas and is configured to perform a conversion between radio frequency (RF) and digital intermediate frequency (IF) signals.

The MU-MIMO system is configured to receive signals from a set of User Equipments (UE) 4a-4d, and to transmit signals to the set of UEs 4a-4d.

Figure 2:
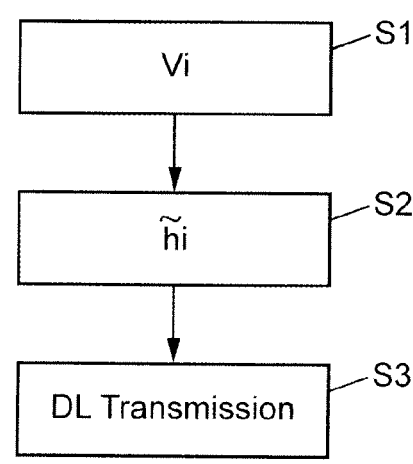
FIG. 2 is a flow chart showing steps of a method for managing a downlink transmission in a MU-MIMO system, according to some embodiments of the invention.

FIG. 2 represents steps of a method for managing a downlink transmission in a Multi User-Multiple Input Multiple Output MU-MIMO system, according to some embodiments of the invention.

In step S1, the BS 1 obtains large scale fading data corresponding to large scale fading over uplink transmission associated with a UE 4i, index i being equal to a, b, c or d in the example of FIG. 1.

There may be two ways for the BS 1 to obtain the large scale fading data. The first is based on the UE's report, and the second is based on an estimation of the large scale fading performed at the BS 1.

According to a first embodiment of the invention, the large scale fading data is received at the BS 1 from the UE 4i.

A large scale fading estimation is here performed at the UE 4i, by using the Channel State Indication CSI-RS.

Then, the UE 4i performs an operation of sorting antennas of RRUs sensed by the UE 4i into the two sets Di and Ui, which are expressed as:

$$D_i = \{j: l_{ij} > l_{ik}, \forall k \in U_i\} \quad (15)$$

$$U_i = \{j: l_{ik} > l_{ij}, \forall k \in D_i\} \quad (16)$$

where $l_{ij}$ refers to an estimation of large scale channel gain from UE 4i to antenna j.

Then, the UE 4i calculates a vector Vi, containing the large scale fading data, and defined as $V_i = (v_{i,1}, v_{i,2}, \ldots, v_{i,M_t})$, where:

$$v_{i,j} = \begin{cases} 1 & j \in U_i \\ 0 & j \in D_i \end{cases}$$

Then, the UE 4i determines a codebook Ci oriented to UE as:

$$C_i = \text{diag}\left(V_i \cdot \sqrt{\frac{M_t}{M_i}}\right) \cdot C_{DFT} \quad (19)$$

where $C_{DFT}$ refers to the DFT codebook defined in 3GPP LTE-A.

Then, the UE 4i calculates its channel direction information (CDI) and channel quality information (CQI) with the codebook Ci, for example by following the way defined in the 3GPP LTE-A specification.

Then, in the feedback from the UE 4i to the BS 1, the UE 4i reports its CDI, its CQI, and its vector Vi. The feedback may be performed periodically.

For instance, based on the downlink CSI-RS estimation, vector $V_1$ determined at UE $4_1$ may be $V_1 = (1,0,0)$. Then, the UE $4_1$ may calculate its CDI and CQI with the modified codebook $C_1 = \text{diag}(\sqrt{3}V_1) \cdot C_{DFT}$. Finally, the CQI feedback is calculated based on a vector of (h1,0,0), while CDI reported to BS 1 still appears as the index pointing to the vector (h1,h2,h3) in the 3GPP LTE-A DFT codebook. At the side of BS 1, the BS 1 uses the CDI and the vector $V_1$ reported from UE $4_1$ to determine the channel vector oriented to UE $4_1$ as (h1,0,0).

According to a second embodiment of the invention, the large scale fading data is obtained by performing a large scale fading estimation at the BS 1. The estimation may be performed by using a Sounding Reference Signal SRS received from the UE 4i.

Here, the UE 4i estimates a large scale fading of CSI-RS over downlink to compute its vector Vi. Then, the UE 4i uses the vector Vi to calculate the CDI and CQI to report to BS 1. The vector Vi is not reported to the BS 1.

For instance, based on the downlink CSI-RS estimation, vector $V_1$ determined at UE $4_1$ is $V_1 = (1,0,0)$. Then, the UE $4_1$ calculates its CDI and CQI with the modified codebook $C_1 = \text{diag}(\sqrt{3}V_1) \cdot C_{DFT}$. Finally, the CQI feedback is calculated based on the vector of (h1,0,0), while CDI reported to BS 1 still appears as the index pointing to (h1,h2,h3) in the 3GPP LTE-A DFT codebook.

Step S1 then comprises, at the BS 1, an operation of sorting antennas of RRUs sensed by the UE 4i into the two sets Di and Ui defined above.

For example, the generation of sets Ui and Di can be described as following:

TABLE 2

Step 1: List the BS's antennas as $T_i = (t_1, t_2, \ldots, t_{M_i})$ with the ascending order of $l_{ij}$
Step 2: Set $D_i = \emptyset$ and $U_i = T_i$
Step 3: For each $t_k$ in $T_i$ If $\left(\sqrt{\frac{M_i}{M_i - 1}} - 1\right)^2 \geq \frac{l_{it_k}^2}{\sum_{j \in U_i} l_{ij}^2 - l_{it_k}^2}$ Then 1) $D_i = D_i + \{t_k\}$
2) $U_i = U_i - \{t_k\}$
Else
  Break Then, a vector Vi containing the large scale fading data is defined as $V_i = (v_{i,1}, v_{i,2}, \ldots, v_{i,M_t})$, where:

$$v_{i,j} = \begin{cases} 1 & j \in U_i \\ 0 & j \in D_i \end{cases}$$

In the example, at the side of BS 1, by estimating SRS over uplink, the BBU can obtain the vector $V_1$ expressed as (1,0,0) as well. After receiving the CDI report from UE $4_1$, the BS 1 can extract the channel vector of (h1,h2,h3) from DFT codebook. Then, the BS 1 may deduce the channel vector oriented to UE $4_1$ as (h1,0,0).

Step S1 is repeated for each UE 4a-4d.

In some embodiments of the invention, a part of the UEs 4a-4d may report their respective vector Vi, while other part of the UEs 4a-4d do not report their vectors Vi.

Step S1 may thus comprise, at the BS 1, an operation of checking whether the vector Vi has been reported for a given UE 4i. Then, if the UE 4i merely reports its CDI and CQI, the BS 1 has to use the second embodiment disclosed above to determine the UE-specific channel vector. If the UE 4i reports the vector Vi in addition to CDI and CQI, the BS 1 can use the first embodiment disclosed above to generate the UE-specific channel vector.

It has to be noted that vector Vi determined at a UE 4i may be different from vector Vi determined at BS 1, even if they are computed in the same way. Indeed, the vector Vi determined at the UE 4i is calculated based on an estimation of CSI-RS over downlink, while the vector Vi determined at the BS 1 is calculated based on an estimation of SRS over uplink. However, if the BS 1 can acquire the vector Vi from UE's report, it doesn't need to calculate the vector Vi by itself.

In step S2, the BS 1 generates a UE-specific channel vector by using the large scale fading data obtained in step S1.

The BS 1 calculates the UE-specific channel vector, for the UE 4i, as:

$$\tilde{h}_i = \hat{h}_i \cdot \text{diag}\left(V_i \cdot \sqrt{\frac{M_t}{M_i}}\right) \quad (17)$$

where $\hat{h}_i$ is a code vector indexed by a UE feedback in a Discrete Fourier Transformation (DFT) codebook, $M_t$ is a total number of RRU antennas, and $M_i$ is a size of set Ui.

Step S2 is repeated for each UE 4a-4d.

In step S3, the BS 1 schedules a downlink transmission by using the UE-specific channel vectors calculated in step S2.

Figure 3:
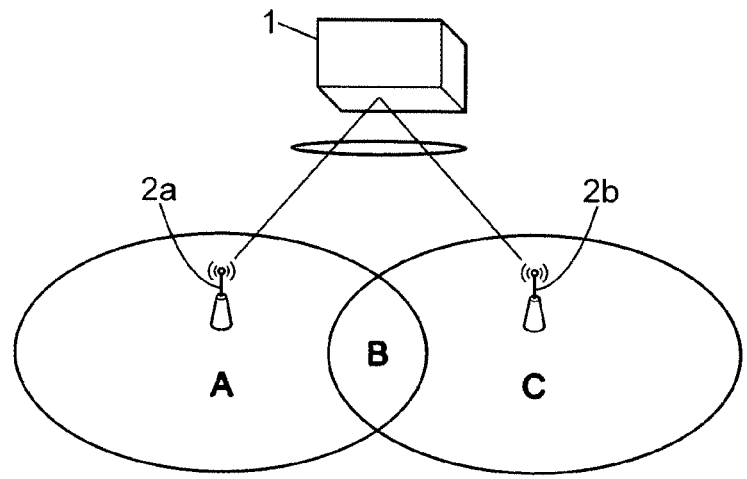
FIG. 3 is a schematic diagram similar to FIG. 1, where the MU-MIMO system comprises a BS connected to two RRUs.
Figure 4:
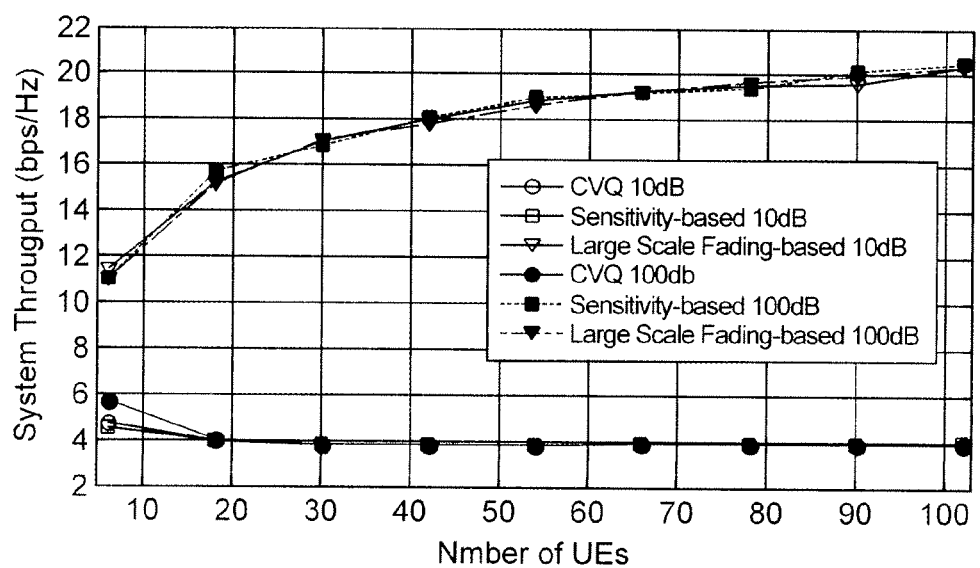
FIG. 4 to FIG. 7 are charts which show the system throughput versus the number of UEs in four scenario.
Figure 5:
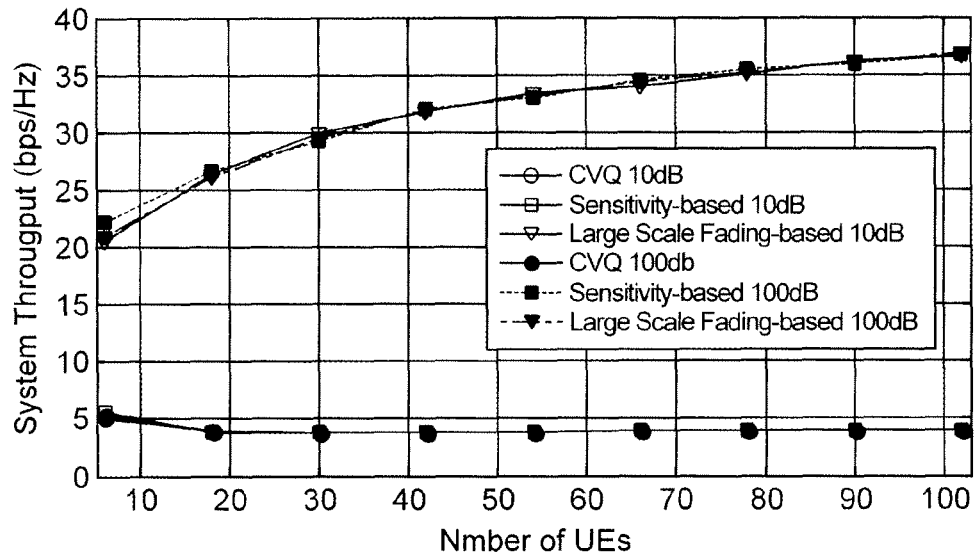
Figure 6:
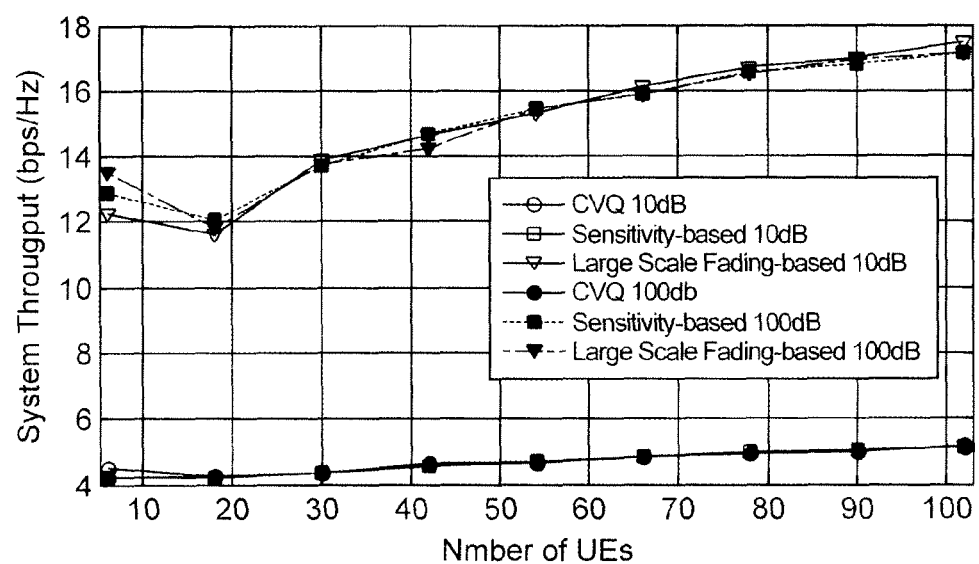

FIG. 3 represents a MU-MIMO system where the BBU 1 connects two RRUs 2a-2b that cover three areas named as A, B C, respectively. This system is used to evaluate a performance by simulating the system throughput in different scenarios.

To simplify the simulation, we assume that the UEs in a same area have the same distance to a given RRU 2a-2b. For instance, the distance between all the UEs in area A and RRU 2b is considered to be a constant. Similarly, the UEs in area A have a constant distance to RRU 2a. In addition, it is assumed that there is no penetration loss and shadow fading between the RRU 2a-2b and the UEs in its coverage. For example, it is assumed that the UEs in area A have no penetration loss and shadow fading to RRU 2a, but there is penetration loss and shadow fading between RRU 2a and the UEs in area C.

For the performance evaluation, we consider four scenarios:

I—UEs are located in area A,
II—UEs are equally located in areas A and C,
III—UEs are equally located in areas A, B and C, and
IV—UEs are equally located in area A and B.

Other simulation parameters are listed in Table 3.

TABLE 3

| | |
|---|---|
| Number of antennas per RRU | 2 |
| Number of antennas per UE | 1 |
| Shadowing model | log-normal random variable, standard deviation = 8.0 dB |
| Fading model | Flat Rayleigh fading |
| Distance between RRU1 and UEs in area A | 5 m |
| Distance between RRU1 and UEs in area B | 20 m |
| Distance between RRU1 and UEs in area C | 30 m |
| Distance between RRU2 and UEs in area A | 30 m |
| Distance between RRU2 and UEs in area B | 20 m |
| Distance between RRU2 and UEs in area C | 5 m |
| Distance dependent path loss | 126.3 + 38 × $\log_{10}$ (d) dB |
| Penetration loss | 10 dB, 100 dB |
| Radio Receiver Sensitivity | −110 dBm |
| Transmit Power per RRU | 20 dBm |
| Noise Power | −104 dBm |
| Bits for feedback | 4 |

Figure 7:
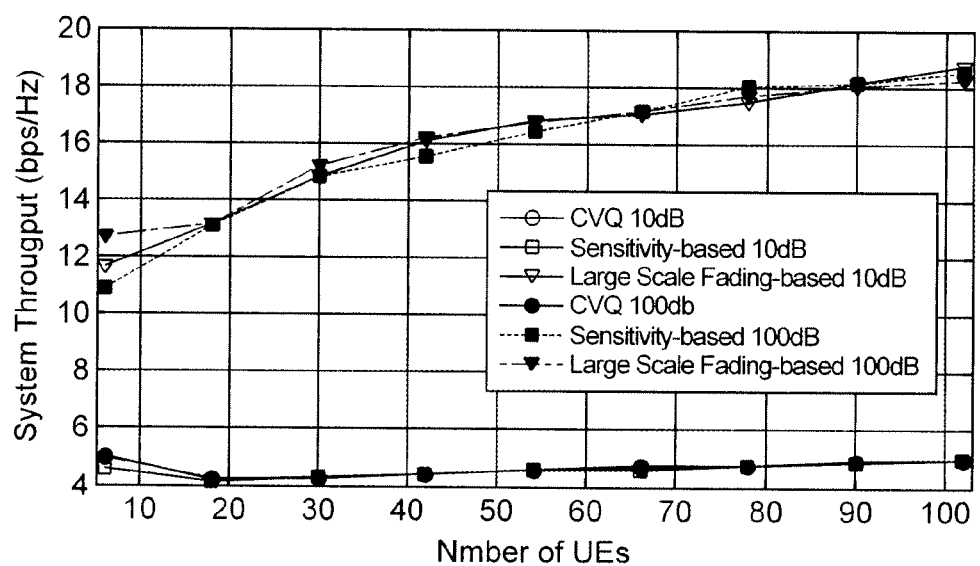

FIG. 4 to FIG. 7 are charts which show the system throughput versus the number of UEs in Scenario I (FIG. 4), in Scenario II (FIG. 5), in Scenario III (FIG. 6) and in Scenario IV (FIG. 7).

In the figures, the curves with the name of CVQ indicates the throughput achieved by the 3GPP LTE-A method, the curves identified as Sensitivity-based refers to the performance of the system disclosed in WO 2011/077260, while the curves termed as Large Scale Fading illustrate the simulation results with the method according to the invention.

It is observed that the 3GPP LTE-A method always has the poor system throughput both in the case of 10 dB penetration loss and 100 dB penetration loss. For the system disclosed in WO 2011/077260, the performance improvement is obvious as the penetration loss is 100 dB, but its performance degrades dramatically in the case with the 10 dB penetration loss.

The method according to the invention always achieves the significant throughput improvement, which reaches 600% at most, no matter in the case whose penetration loss is 10 dB or 100 dB.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. A method comprising:
managing a downlink transmission in a Multi User-Multiple Input Multiple Output MU-MIMO system, the MU-MIMO system comprising a base station, and a set of remote radio units connected to the base station, the method comprising the following acts performed by the base station:
obtaining large scale fading data related to a large scale fading over uplink transmission associated with a user equipment (UE), the act of obtaining comprising sorting remote radio units antennas sensed by the user equipment into two sets Di and Ui which are expressed as:

$$D_i = \{j : l_{ij} > l_{ik}, \forall k \in U_i\}$$

$$U_i = \{j : l_{ik} > l_{ij}, \forall k \in D_i\}$$

where $l_{ij}$ refers to an estimation of large scale channel gain from user equipment i to antenna j,
generating a UE-specific channel vector by using the large scale fading data, and
scheduling the downlink transmission in the MU-MIMO system by using the UE-specific channel vector.

2. The method according to claim 1, wherein the said large scale fading data is obtained by the base station performing a large scale fading estimation.

3. The method according to claim 2, further comprising:
receiving a Sounding Reference Signal SRS received from the user equipment,
wherein the estimation is performed by the base station using the Sounding Reference Signal SRS received from the user equipment.

4. The method according to claim 1, wherein the said large scale fading data is obtained by performing a large scale fading estimation by a user equipment, and wherein the act of obtaining the large scale fading data comprises the base station receiving the large scale fading estimation from the user equipment.

5. The method according to claim 4, wherein the method comprises the base station transmitting a Channel State Indication CSI-RS to the user equipment, and wherein the estimation is performed by using the Channel State Indication CSI-RS received at the user equipment from the base station.

6. The method according to claim 1, wherein the act of generating comprises the base station calculating a UE-specific channel vector as:

$$\tilde{h}_i = \hat{h}_i \cdot \text{diag}\left(V_i \cdot \sqrt{\frac{M_t}{M_i}}\right)$$

where $\hat{h}_i$ is a code vector indexed by a user equipment feedback in a Discrete Fourier Transformation codebook, $M_t$ is a total number of remote radio units antennas, $M_i$ is a size of set Ui, and Vi is a vector defined as $V_i=(v_{i,1}, v_{i,2}, \ldots, v_{i,M_t})$, where $$v_{i,j} = \begin{cases} 1 & j \in U_i \\ 0 & j \in D_i \end{cases}.$$

7. A non-transitory computer readable medium comprising a computer program product and having thereon a computer program comprising program instructions, the computer program being loadable into a data-processing unit and adapted to cause the data-processing unit of a base station to carry out a method when the computer program is run by the data-processing unit, the method comprising:
managing a downlink transmission by the base station in a Multi User-Multiple Input Multiple Output MU-MIMO system, the MU-MIMO system comprising the base station, and a set of remote radio units connected to the base station, wherein managing comprises:
obtaining large scale fading data related to a large scale fading over uplink transmission associated with a user equipment (UE), the act of obtaining comprising sorting remote radio units antennas sensed by the user equipment into two sets Di and Ui which are expressed as:

$D_i=\{j:l_{ij}>l_{ik},\forall k\in U_i\}$ $U_i=\{j:l_{ik}>l_{ij},\forall k\in D_i\}$ where $l_{ij}$ refers to an estimation of large scale channel gain from user equipment i to antenna j,
generating a UE-specific channel vector by using the large scale fading data, and
scheduling a downlink transmission in the MU-MIMO system by using the UE-specific channel vector.

8. A base station of a Multi User-Multiple Input Multiple Output MU-MIMO system, the MU-MIMO system further comprising a set of remote radio units connected to the base station, the base station comprising:
a non-transitory computer-readable medium comprising instructions stored thereon;
a data processing unit configured by the instructions to perform acts of:
managing a downlink transmission in the Multi User-Multiple Input Multiple Output MU-MIMO system, wherein managing comprises:
obtaining large scale fading data related to a large scale fading over uplink transmission associated with a user equipment, the act of obtaining comprising sorting remote radio units antennas sensed by the user equipment into two sets Di and Ui which are expressed as:

$D_i=\{j:l_{ij}>l_{ik},\forall k\in U_i\}$ $U_i=\{j:l_{ik}>l_{ij},\forall k\in D_i\}$ where $l_{ij}$ refers to an estimation of large scale channel gain from user equipment i to antenna j,
generating a UE-specific channel vector by using the large scale fading data, and
scheduling the downlink transmission in the MU-MIMO system by using the UE-specific channel vector.

9. A Multi User-Multiple Input Multiple Output MU-MIMO system, comprising the base station according to claim 8, and the set of remote radio units connected to the base station.

* * * * *